United States Patent Office 3,366,178
Patented Jan. 30, 1968

3,366,178
METHOD OF FRACTURING AND PROPPING A SUBTERRANEAN FORMATION
William T. Malone, James R. Williams, Jr., and James A. Derby, Duncan, Okla., assignors to Halliburton Company, Duncan, Okla., a corporation of Delaware
No Drawing. Filed Sept. 10, 1965, Ser. No. 486,517
24 Claims. (Cl. 166—39)

ABSTRACT OF THE DISCLOSURE

This patent describes a method of fracturing and propping a subterranean formation traversed by a well bore which comprises injecting into the formation a volume of a liquid hardenable carrier composition containing dispersed therein a removable material, permitting the carrier to harden, and thereafter removing the removable material from the carrier to provide a porous permeable propping material within the formation capable of conducting fluids.

---

This invention relates to a method of propping a subterranean formation which is traversed by a well bore. More particularly, this invention relates to a new and original method of fracturing a well formation and especially to a method which eliminates the necessity of propping agents.

It is often desirable to prop or support portions of well formations in a variety of circumstances. The formation can be propped to prevent the collapsing of part of the formation in the vicinity of the well bore. For example, prior to casing and cementing, it is necessary that the well bore be relatively uniform in diameter and free of loose matter, and the like. The propping and supporting of a formation is also an essential feature of hydraulic fracturing wherein, in the conventional process, a liquid usually containing a granular propping agent is pumped into the formation until fracturing occurs. Injection is usually continued to place some of the liquid into the fractures formed. Thereafter, the liquid is removed leaving fractures which are propped open by the granular material. It will be readily appreciated that the propping of the formations must not completely shut off the flow of liquids from the formation into the well bore. It is essential that a relatively high degree of permeability be maintained in the producing region of the well in order that the fluids continue to migrate from the producing region into the bore hole where it can be removed to the surface, or in the case of injection wells, in order that fluids be capable of migrating or moving from the bore hole into the formation. Any propping material must, therefore, be able to withstand all or part of the weight of the formation above it without unduely restricting fluid conductivity.

Accordingly, this invention relates to the use of a liquid hardenable carrier composition containing a removable material which is injected into the formation, and there permitted to undergo a physical change due to appropriate chemical reaction after a suitable time lapse to become a porous, permeable, solid propping or supporting material capable of conducting formation liquids. More particularly, the invention relates to the use of a liquid hardenable carrier composition to transport a removable material into the desired formation, using hydraulic energies, i.e., pressure, temperature, velocity and viscosity. Generally, the method of our invention is applied to a formation to fracture it, thus permitting entry of the liquid composition. The liquid composition then hardens and the removable material is removed to leave a supporting or propping porous material capable of conducting fluids. In this way, the need for the use of conventional propping agents such as sand is eliminated.

It is therefore an object of this invention to provide a method for the propping of fractured permeable portions of subterranean formations.

It is another object of this invention to provide a method of fracturing and propping a formation with increased facility by the use of liquid constituents which eliminates the use of conventional propping agents.

It is yet another object of this invention to provide a method of propping the fractured portions of a subterranean formation using a liquid hardenable carrier composition containing a removable material which can be subsequently removed from the hardened carrier composition to provide a supporting material capable of conducting fluids.

These and other objects of the invention will be apparent to those skilled in the art from the more detailed description which follows.

Broadly, the present invention relates to a method for supporting and propping a subterranean formation which is traversed by a well bore comprising injecting into the formation a liquid hardenable carrier containing dispersed therein a removable material, permitting the carrier to harden in place, and thereafter removing said removable material, leaving a porous permeable supporting material within the producing formation which is capable of conducting liquids. The invention particularly comprehends a fracturing process employing the liquid hardenable carrier containing a removable material.

Unlike conventional well-treating fluids, the liquid composition of this invention is not produced back from the formation. Likewise, the method of this invention does not involve the formation of porous packs within the annular space between the well bore and the casing. The injected liquid of this invention changes to a solid due to the chemical reaction within the formation. The removable material is then removed from the hardened carrier composition to leave the solid permeable material capable of conducting fluids. The resulting solid is capable of resisting forces tending to close the pores, fractures or other openings in the formation. The recognition of the fact that a hardened porous material can withstand the weight of the formation while maintaining fluid conductivity is a significant feature of our invention.

The liquid hardenable carrier material may be essentially any injectable liquid material capable of at least temporarily suspending the removable material and which will undergo hardening, i.e., curing or setting within the formation. One type of liquid hardenable carrier composition injected into the formation in accordance with the method of this invention generally comprises a liquid condensation polymer such as phenol-aldehyde resin. The preferred phenol-aldehyde resins are those of the type sold commercially under the trade name "Durez." Other suitable phenolic polymers are those described in U.S. Patent No. 2,546,624, the disclosure of which is incorporated herein by reference. Other suitable condensation polymers include the urea-aldehydes and polyanhydrides. In general, the condensation polymers used herein are those which are capable of hardening at a temperature of from 80° F. to 300° F. The setting time, temperature and viscosity properties needed would dictate the polymer to be used on any particular well. Many other liquid hardenable carrier materials are well adapted for use in this invention as will be immediately apparent to those skilled in the art. For example, any of the conventional well cementing slurries may be used.

In general, the choice of the removable material is not critical so long as it does not unduly protract the hardening process of the liquid hardenable carrier, and is capable of removal by heat, solvents, chemical reaction, or the like. The removable materials may be solids, liquids or gases. Typically, the removable materials are of a water soluble, oil soluble, acid soluble or heat softenable nature, and include cane sugar, beet sugar, sodium chloride, gilsonite, hard blown asphalt, rosin, or similar granular materials. Various removable solids such as paraffin may be utilized in strong or flake form. The removable material may also be a liquid such as emulsion droplets, coagulated silica or diesel oil, or gases.

The amount of removable material in the liquid hardenable carrier composition is generally that amount sufficient to provide the desired degree of conductivity and is limited only to the load carrying capacity of the hardened carrier. In most cases, the removable material is employed in an amount of from about 1% to about 100% by weight of the carrier. The removable material can be removed from the hardened carrier by water, steam, acid, oil, kerosene, heat or other technique, as will be apparent to those skilled in the art. For example, the soluble sodium chloride salt and the sugars are readily dissolved in water or other suitable solvents. Similarly, gilsonite and/or paraffin are removed by oil or heat. The removable materials, particularly the sugars, are also removed by heat applied to the formation as steam or by the use of heating elements lowered into the bore hole. The nature of the heating to accomplish removal is limited only by the decomposition temperature of the hardened carrier materials. For the ordinary condensation polymers and cements, temperatures up to about 500° F. are satisfactory. However, where the melting point of the recoverable material requires higher temperatures, any of the known high temperature stable hardenable carrier materials may be used. In many wells, the formation itself provides sufficient heat to melt or vaporize the removable material, in which case no external heating means is needed. After the removal material has been removed from the hardened carrier, it is brought to the surface by pumping, bailing, or producing of the formation. The resulting permeable supporting hardened carrier generally has a permeability of from about 10 to about 30 darcys or more.

The hardenable carrier may also contain conventional cross-linking agents, catalysts, curing accelerators. In addition, fillers and extenders such as sand may be added to the carrier in an amount up to about 100% by weight, based on the weight of mixture.

In fracturing and propping according to this invention, the liquid hardenable carrier containing the removable material is introduced into a confined zone of a well at a rate sufficient to increase the pressure exerted in the zone until formation fracture occurs. The injection of the liquid is continued to displace at least some of the liquid into the fractures. Additional fluid may be injected as a follower. Thereafter, the carrier is permitted to harden and the removable material is removed to leave a porous supporting material capable of conducting fluids. The injection of the liquid hardenable carrier is accomplished by conventional equipment, and hence no detailed description thereof is believed to be necessary.

The following examples illustrate the invention. In the examples, the parts and percentages are by weight unless otherwise indicated.

EXAMPLES

Phenol-formaldehyde (Durez #21857) specimens containing various amounts of cane sugar, beet sugar, table salt or gilsonite were cured both under atmospheric pressure and 1000 p.s.i. average. All Durez #21857 samples used 8 percent by weight diethyl sulfate as an accelerator. The specimens were prepared by mixing the base material by hand with a spatula in a 1 quart container. The removable material was blended to a uniform dispersion, then poured in a 1¾ inch ID x 3 inch long glass tubing mold. In some cases, the degree of mixing was varied from mixing by hand to beating in a Waring Blendor for 2-3 minutes. After suitable mixing, the samples were poured in molds and cured at temperatures of 140°–180° F. In some cases, the samples were cured under 1000 p.s.i. and 140° F. in an autoclave.

| Composition | Cure Temp. (° F.) | Cure Time (hrs.) | Remarks |
|---|---|---|---|
| 200 grams Durez #21857 and 200 grams granulated cane sugar. | 140 | 2 | Cured in autoclave under mineral oil at 1,000 p.s.i., set hard, leached in fresh water for 5 minutes, very permeable. |

EXAMPLE 2

| Composition | Cure Temp. (° F.) | Cure Time (hrs.) | Remarks |
|---|---|---|---|
| 200 grams Durez #21857 and 200 grams granulated cane sugar. | 180 | 2 | Cured at atmospheric pressure, set hard, leached 2 minutes in fresh water, very permeable. |

EXAMPLE 3

| Composition | Cure Temp. (° F.) | Cure Time (hrs.) | Remarks |
|---|---|---|---|
| 100 grams Durez #21857, 60 grams C–H cane sugar and 100 grams table salt. | 160 | 1½ | Cured at atmospheric pressure, set hard, washed in water, very porous and permeable in few minutes, compressive strength 925 p.s.i. |

EXAMPLE 4

| Composition | Cure Temp. (° F.) | Cure Time (hrs.) | Remarks |
|---|---|---|---|
| 100 grams Durez #21857 and 150 grams GW extra fine beet sugar. | 160 | 1½ | Washed in water, very porous and permeable, medium to coarse grained, compressive strength 660 p.s.i. |

EXAMPLE 5

| Composition | Cure Temp. (° F.) | Cure Time (hrs.) | Remarks |
|---|---|---|---|
| 100 grams Durez #21857 and 150 grams Gilsonite. | 160 | 1½ | Washed in oil, very porous and permeable, medium to coarse grained, compressive strength 610 p.s.i. |

The following example illustrates the use of a cement slurry as the liquid hardenable carrier.

EXAMPLE 6

| Composition | Cure Temp. (° F.) | Cure Time (hrs.) | Remarks |
|---|---|---|---|
| Portland cement 0.5 water/cement ratio 30% by weight of ½ inch by ½ inch diameter paraffin string. | 120 | 16 | A cured specimen of 0.84 inch by 1.75 inch diameter was treated with kerosene at 120° F. and 1,000 p.s.i. Air permeability=250 md. |

A flow test cell was used to test a short cylinder of material. The sample was 5.0 inch O.D. and thickness could be varied from 0.25 inch to 0.35 inch. The cell was bolted together with the bolts furnishing the load. An aluminum mold was used for casting, under temperature and pressure, a sample of any desired thickness up to ¾ inch in the form permitting the placing of the samples between the top and bottom plates of the flow cell and allow radial flow from a ¼ inch hole in the center to the edges of the 5 inch O.D. sample. Various samples were placed in a press and flow rates and pressures measured while various overburden loads were applied. The radial permeability could be calculated for any desired load. The data indicate the time required for the passage of 250 cc. of water through the specimen under varying loads after the sugar had been removed from the cured resin.

EXAMPLE 7

| Composition | Cure Temp. (° F.) | Cure Time (hrs.) | Results | | |
|---|---|---|---|---|---|
| | | | Time, sec. | Water, p.s.i. | Load, p.s.i. |
| 100 grams Durez #21857 and 100 grams granulated cane sugar. | 145 | 1½ | 19.8 | 10 | 0 |
| | | | 20.5 | 10 | 1,020 |
| | | | 21.5 | 10 | 1,530 |
| | | | 21.0 | 10 | 2,040 |
| | | | 21.7 | 10 | 2,550 |
| | | | 22.8 | 10 | 3,050 |
| | | | 24.0 | 10 | 4,080 |
| | | | 24.5 | 10 | 5,100 |
| | | | 24.5 | 10 | 6,120 |
| | | | 24.4 | 10 | 7,150 |

To 200 grams of Durez #21857 were added 200 grams C–H granulated cane sugar and 100 grams 20–40 Ottawa sand. After mixing, the composition was cured at 140° F. for 1½ hours. The sample was placed in the test cell and water was applied to first flush out the sugar and then to measure the time required to pass 250 cc. of water and the permeability under various loads.

EXAMPLE 8

| Water Pressure, p.s.i. | Time, sec. | Load, lbs. | Height Sample, inch | Permeability, darcys |
|---|---|---|---|---|
| 2.0 | 16.65 | 2,000 | 0.653 | |
| 2.0 | 15.2 | 2,000 | .653 | |
| 9.0 | 6.4 | 2,000 | .653 | |
| 5.0 | 8.0 | 2,000 | .653 | |
| 5.0 | 8.1 | 8,000 | .653 | 20.8 |
| 5.0 | 8.35 | 12,000 | .643 | |
| 5.0 | 8.8 | 16,000 | .623 | |
| 5.0 | 8.65 | 20,000 | .613 | |
| 5.5 | 8.4 | 20,000 | .613 | 19.6 |
| 5.0 | 8.65 | 24,000 | .583 | |
| 5.0 | 9.2 | 28,000 | .573 | |
| 5.0 | 8.35 | 30,000 | .533 | 24.6 |
| 5.5 | 8.65 | 30,000 | .533 | |
| 6.0 | 8.65 | 36,000 | .513 | |
| 6.0 | 8.89 | 40,000 | .483 | 21.3 |
| 6.5 | 9.65 | 50,000 | .443 | 20.2 |
| 14.5 | 10.45 | 80,000 | .363 | 10.0 |
| 44.5 | 32.00 | 120,000 | .293 | 1.31 |
| 47.0 | 71.15 | 130,000 | .283 | 0.58 |

When the foregoing example was repeated using a urea formaldehyde polymer in lieu of phenol-formaldehyde, satisfactory results were also obtained.

The data of Examples 7 and 8 clearly demonstrate that the porous permeable hardened resin provided by the method of this invention is capable of supporting incompetent formations while retaining a degree of porosity sufficient to permit passage of formation liquids.

This example illustrates the production of a porous cement using a liquid removable material.

Composition _____ Portland cement containing a small amount of diesel oil. Water/cement ratio equal 0.5.
Cure Temp. ____ 140° F.
Cure Time _____ 4 hrs.
Remarks _____ Soft porous product.

Having fully described the invention, it is intended that it be limited only by the lawful scope of the appended claims.

We claim:
1. A method of supporting and propping a subterranean formation traversed by a well bore which comprises injecting into the formation a volume of a liquid hardenable carrier composition containing dispersed therein a solid removable material, permitting the carrier to harden and thereafter removing the removable material from the carrier to provide a porous permeable propping material within the formation capable of conducting fluids.

2. A method of claim 1 wherein the removable material is present in an amount from about 1% to about 100% by weight of the hardenable carrier.

3. The method of claim 1 wherein the removable material is a solid granular material.

4. The method of claim 1 wherein the removable material is sodium chloride salt which is removed with steam.

5. The method of claim 1 wherein the removable material is gilsonite which is removed with oil.

6. The method of claim 1 wherein the removable material is removed by contact with hot water.

7. A method of fracturing and propping a subterranean formation traversed by a well bore which comprises injecting, at a pressure sufficient to fracture the formation, into the formation a volume of a liquid condensation polymer composition containing dispersed therein a removable material, permitting the polymer to set, and thereafter removing the removable material from the resin to provide a porous permeable propping material within the formation capable of conducting formation fluids.

8. The method of claim 7 wherein the condensation polymer sets at a temperature of from about 80° F. to 300° F.

9. A method of supporting and propping a subterranean formation traversed by a well bore which comprises injecting into the formation a volume of a liquid hardenable cement composition containing dispersed therein a solid removable material, permitting the cement to harden and thereafter removing the removable material from the cement to provide a porous permeable propping material within the formation capable of conducting fluids.

10. A method of fracturing and propping a subterranean formation traversed by a well bore which comprises injecting, at a pressure sufficient to fracture the formation, into the formation a volume of a liquid hardenable carrier composition containing dispersed therein a removable material, permitting the carrier to harden, and thereafter removing the removable material from the carrier to provide a porous permeable propping material within the formation capable of conducting formation fluids.

11. The method of claim 10 wherein the removable material is present in an amount from about 1% to about 100% by weight of the hardenable carrier.

12. The method of claim 10 wherein the removable material is sugar.

13. The method of claim 10 wherein the removable material is sodium chloride salt.

14. The method of claim 10 wherein the removable material is gilsonite.

15. A method of fracturing and propping a subterranean formation traversed by a well bore which comprises injecting, at a pressure sufficient to fracture the formation, into the formation a volume of a liquid hardenable carrier composition containing dispersed therein a removable liquid material, permitting the liquid hardenable carrier to set, and thereafter removing the removable material from the hardened carrier to provide a porous permeable propping material within the formation capable of conducting formation fluids.

16. A method of fracturing and propping a subterranean formation traversed by a well bore which comprises injecting, at a pressure sufficient to fracture the formation, into a zone of the formation a volume of a liquid hardenable carrier composition containing dispersed therein a removable material to increase the pressure exerted in said zone until fracture occurs, displacing at least some of said composition into the fracture, permitting the liquid hardenable carrier to set, and thereafter removing the removable material from the hardened carrier to provide a porous permeable propping material within the formation capable of conducting formation fluids.

17. A method of fracturing and propping a subterranean formation traversed by a well bore which comprises injecting, at a pressure sufficient to fracture the formation, into a zone of the formation a volume of a liquid hardenable carrier composition containing dispersed therein a removable granular material to increase the pressure exerted in said zone until fracture occurs, displacing at least some of said composition into the fracture, permitting the liquid hardenable carrier to set, and thereafter removing the removable material from the hardened carrier to provide a porous permeable propping material within the formation capable of conducting formation fluids.

18. A method of fracturing and propping a subterranean formation traversed by a well bore which comprises injecting, at a pressure sufficient to fracture the formation, into a zone of the formation a volume of a liquid hardenable resin composition containing dispersed therein a removable granular material to increase the pressure exerted in said zone until fracture occurs, displacing at least some of said composition into the fracture, permitting the liquid hardenable resin to set, and thereafter removing the removable material from the hardened resin to provide a porous permeable propping material within the formation capable of conducting formation fluids.

19. A method of fracturing and propping a subterranean formation traversed by a well bore which comprises injecting, at a pressure sufficient to fracture the formation, into a zone of the formation a volume of a liquid hardenable cement composition containing dispersed therein a removable granular material to increase the pressure exerted in said zone until fracture occurs, displacing at least some of said composition into the fracture, permitting the liquid hardenable cement to set, and thereafter removing the removable material from the hardened cement to provide a porous permeable propping material within the formation capable of conducting formation fluids.

20. A method of fracturing and propping a subterranean formation traversed by a well bore which comprises injecting, at a pressure sufficient to fracture the formation, into the formation a volume of a liquid phenolic polymer composition containing dispersed therein an oil-soluble removable granular material, permitting the polymer to set, and thereafter removing the removable material from the resin by contact with oil to provide a porous permeable propping material within the formation capable of conducting formation fluids.

21. A method of fracturing and propping a subterranean formation traversed by a well bore which comprises injecting, at a pressure sufficient to fracture the formation, into the formation a volume of a liquid condensation polymer composition containing dispersed therein a removable granular material, permitting the polymer to set, and thereafter removing the removable material from the polymer by application of heat to provide a porous permeable propping material within the formation capable of conducting formation fluids.

22. A method of claim 21 wherein the removable material is present in an amount from about 1% to about 100% by weight of the polymer.

23. The method of claim 21 wherein the heat is provided by steam.

24. The method of claim 21 wherein the heat is provided by heating elements lowered into the well bore.

References Cited

UNITED STATES PATENTS

| | | | |
|---|---|---|---|
| 2,187,895 | 1/1940 | Sanders | 166—12 |
| 2,193,808 | 3/1940 | Dieterich | 166—12 |
| 2,288,557 | 6/1942 | Vollmer | 166—12 |
| 2,674,322 | 4/1954 | Cardwell | 166—33 X |
| 2,674,323 | 4/1954 | Cardwell | 166—12 |
| 2,770,306 | 12/1956 | Clark | 166—33 |
| 2,773,670 | 12/1956 | Miller. | |
| 3,003,555 | 10/1961 | Freeman et al. | 166—21 |
| 3,208,522 | 9/1965 | Roebuck et al. | 166—29 |

STEPHEN J. NOVOSAD, *Primary Examiner.*